US012608440B2

(12) United States Patent
Nie et al.

(10) Patent No.: US 12,608,440 B2
(45) Date of Patent: Apr. 21, 2026

(54) SAMPLE DELTA MONITORING

(71) Applicant: eBay Inc., San Jose, CA (US)

(72) Inventors: Keyu Nie, Mountain View, CA (US); Ted Tao Yuan, Cupertino, CA (US); Bingquan Xu, San Jose, CA (US)

(73) Assignee: eBay Inc., San Jose, CA (US)

( * ) Notice: Subject to any disclaimer, the term of this patent is extended or adjusted under 35 U.S.C. 154(b) by 1074 days.

(21) Appl. No.: 17/626,704

(22) PCT Filed: Jul. 19, 2019

(86) PCT No.: PCT/CN2019/096663
§ 371 (c)(1),
(2) Date: Jan. 12, 2022

(87) PCT Pub. No.: WO2021/012074
PCT Pub. Date: Jan. 28, 2021

(65) Prior Publication Data
US 2022/0245219 A1 Aug. 4, 2022

(51) Int. Cl.
*G06F 17/18* (2006.01)
*G06Q 30/0201* (2023.01)
(52) U.S. Cl.
CPC ......... *G06F 17/18* (2013.01); *G06Q 30/0201* (2013.01)
(58) Field of Classification Search
CPC ..................................................... G06F 17/18
See application file for complete search history.

(56) References Cited

U.S. PATENT DOCUMENTS

| | | | |
|---|---|---|---|
| 2004/0267566 A1 | 12/2004 | Badgett et al. | |
| 2017/0278147 A1 | 9/2017 | Gaikwad et al. | |
| 2017/0323329 A1 | 11/2017 | Katariya et al. | |
| 2017/0330114 A1 | 11/2017 | Ghavamzadeh et al. | |
| 2021/0158906 A1* | 5/2021 | Xie ........................ | G16H 10/20 |

FOREIGN PATENT DOCUMENTS

| | | |
|---|---|---|
| CN | 202050509 U | 11/2011 |
| CN | 103205483 A | 7/2013 |
| CN | 103970973 A | 8/2014 |
| CN | 107066783 A | 8/2017 |
| CN | 109091455 A | 12/2018 |
| CN | 109172828 A | 1/2019 |

(Continued)

OTHER PUBLICATIONS

International Preliminary Report on Patentability received for PCT Application No. PCT/CN2019/096663, mailed on Feb. 3, 2022, 5 Pages.

(Continued)

*Primary Examiner* — Bijan Mapar
(74) *Attorney, Agent, or Firm* — FIG. 1 Patents

(57) ABSTRACT

Sample delta monitoring is described herein. In one or more implementations, first and second experimental groups are defined in a randomized controlled trial. A first set of data indicative of a first experimental group in the randomized controlled trial is received. A second set of data indicative of a second experimental group in the randomized controlled trial is received. Based on sample counts of the first and second sets of data, an indication is generated that the experimental groups in the randomized controlled trial are skewed.

20 Claims, 8 Drawing Sheets

(56)                    References Cited

FOREIGN PATENT DOCUMENTS

| WO | 2018/089912 | A2 | 5/2018 |
| WO | 2021/012074 | A1 | 1/2021 |

OTHER PUBLICATIONS

International Search Report received for PCT Application No. PCT/CN2019/096663, mailed on Apr. 17, 2020, 6 Pages.
International Written Opinion received for PCT Application No. PCT/CN2019/096663, mailed on Apr. 17, 2020, 3 pages.
Wald, Abraham, "Sequential tests of statistical hypotheses", Annals of Mathematical Statistics, 16(2), 1945, pp. 117-186.
"Foreign Office Action", CN Application No. 201980098565.9, Jul. 3, 2025, 20 pages.

* cited by examiner

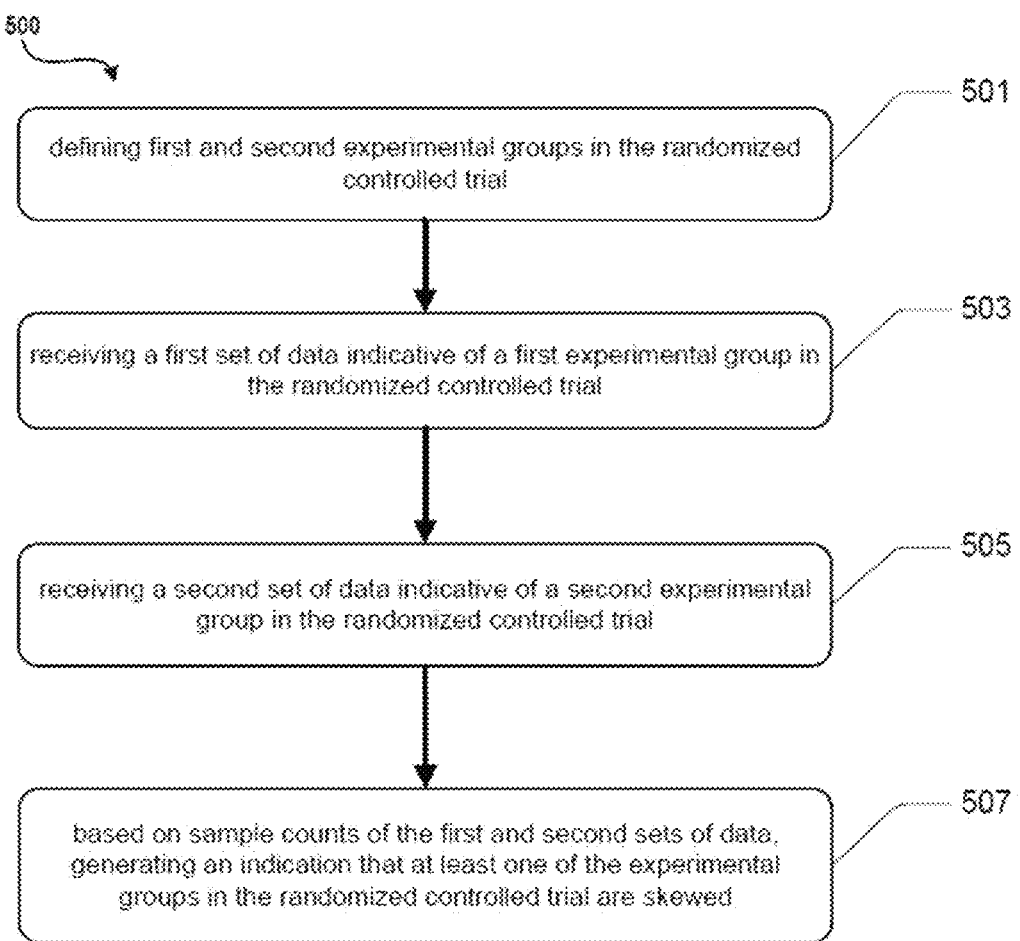

500 defining first and second experimental groups in the randomized controlled trial ⸺ 501 receiving a first set of data indicative of a first experimental group in the randomized controlled trial ⸺ 503 receiving a second set of data indicative of a second experimental group in the randomized controlled trial ⸺ 505 based on sample counts of the first and second sets of data, generating an indication that at least one of the experimental groups in the randomized controlled trial are skewed ⸺ 507

FIG. 5

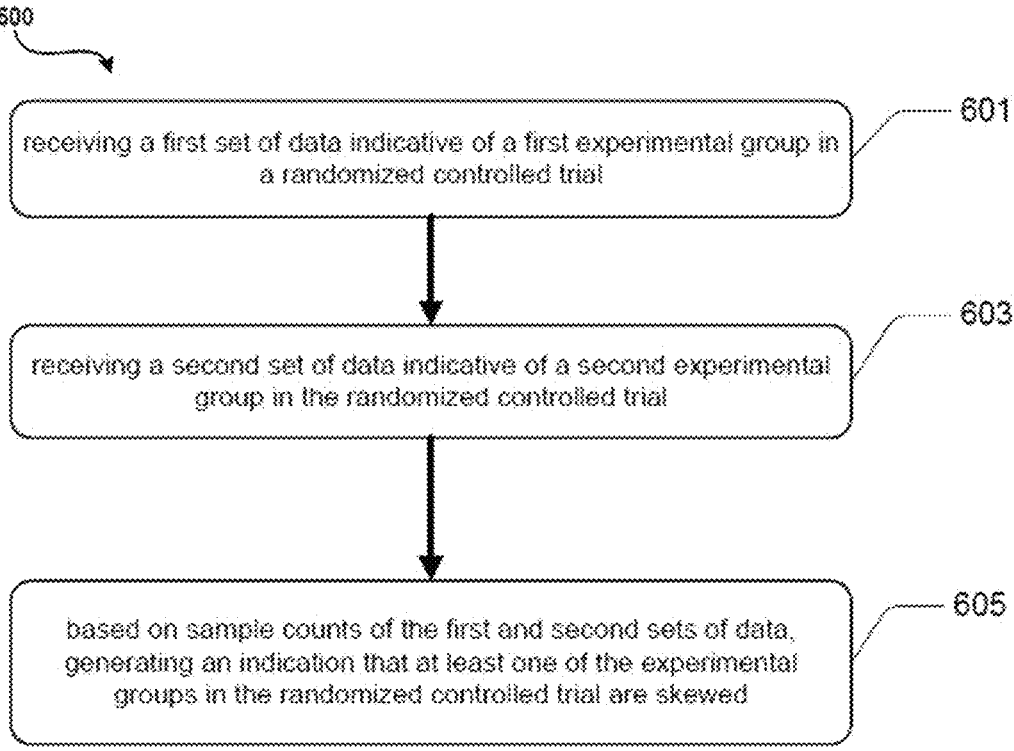

600

601 — receiving a first set of data indicative of a first experimental group in a randomized controlled trial 603 — receiving a second set of data indicative of a second experimental group in the randomized controlled trial 605 — based on sample counts of the first and second sets of data, generating an indication that at least one of the experimental groups in the randomized controlled trial are skewed

FIG. 6

SAMPLE DELTA MONITORING

BACKGROUND

In a randomized controlled trial, subjects are randomly allocated to two or more groups and the groups are compared with respect to a selected response. The treated groups may have alternative conditions being assessed, while the control group receives the default condition. For example, in A/B testing, two-sample hypothesis testing is applied to compare the outcomes from two groups/variants. The two variants may include a current or control version, and a treatment version that is modified in some respect. In such randomized controlled trials, an objective is to reduce sources of bias when testing various conditions.

SUMMARY

When conducting a randomized controlled trial, it is important to ensure that the observed ratio of populations between test and control groups match the designed expected ratio, i.e., 50% vs 50%. If the observed population ratio is significantly different from the expected value, the experimenters should be alerted and the experiment should be halted to avoid potential sample bias. In general, a type I error is the rejection of a true null hypothesis, which may also be referred to as a false positive. A type II error is the failure of rejecting a false null hypothesis, which may also be referred to as a false negative. It is desired to minimize one or both of these errors. The present disclosure describes systems and methods for reducing false alerts for population ratio differences due to the random nature of sample data that may occur at the early stage of a trial.

Various embodiments are disclosed for detecting sample skew between control and experimental/treatment groups in a randomized controlled experiment, without requiring a learning period. In an embodiment, the sample delta, or the difference between the expected sample count ratio and the observed sample count ratio among experiment groups, may be used to monitor and determine if the skew (sample delta) reaches a threshold. This allows for earlier detection of skew while minimizing false alarms, which in turn allows for earlier intervention and avoidance of expensive test re-runs when sample sizes go astray.

In one embodiment, two independent hypothesis tests are created for detecting direction and upper and lower boundaries of the sample delta metric. The logarithm of the likelihood ratio of the observed samples under null and alternative hypothesis may be used as test statistics. Sequential test algorithms and rules may be applied to control false positive/negative rates.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

BRIEF DESCRIPTION OF THE DRAWINGS

The detailed description is described with reference to the accompanying figures.

FIG. 5 is a flow diagram showing aspects of an illustrative routine, according to one embodiment disclosed herein.

FIG. 6 is a flow diagram showing aspects of an illustrative routine, according to one embodiment disclosed herein.

DETAILED DESCRIPTION

The following Detailed Description presents technologies for detecting skew/sample delta between groups, such as control and treatment groups, in a randomized controlled experiment. In various embodiments, the sample delta, or the difference between the expected sample count ratio and the observed sample count ratio among experiment groups, may be used to monitor and determine if the skew reaches a threshold. The logarithm of the likelihood ratio of the observed samples under null and alternative hypotheses may be used as test statistics, and sequential test algorithms and rules may be applied to control false positive/negative rates.

The disclosed technologies can enhance the functionality and efficiency of various online and other test environments. As just one example, by reducing the amount of retesting in a randomized controlled experiment, the use of computing resources can be improved. Technical benefits other than those specifically mentioned herein might also be realized through implementations of the disclosed technologies.

It is to be appreciated that while the technologies disclosed herein are primarily described in the context of randomized testing, the technologies described herein can be utilized to minimize skew in other contexts, which will be apparent to those of skill in the art.

Referring to the appended drawings, in which like numerals represent like elements throughout the several FIGURES, aspects of various technologies for test conduct and monitoring will be described. In the following detailed description, references are made to the accompanying drawings that form a part hereof, and which are shown by way of illustration specific configurations or examples.

As part of performing a randomized controlled trial, such as in A/B testing, it is desired to ensure that the actual observed randomized traffic proportion between variants/branches is consistent with the experiment's designed ratio within desired thresholds. For example, for two variants testing, the desired ratio may be 50% to 50%.

To illustrate one example, A/B testing may be used to compare two versions of a function feature, for example by testing the subjects' responses to variant A and variant B, and determining which of the two variants is more consistent with one or more objectives. In one example, a first version A may be a current or control version, and a second version B may be the treatment version that is modified in some respect. For example, a website may be presented with an A version and a B version, and the results can be compared to determine if the treatment version results in higher sales volume. The treatment version may include, for example, changes in format and layout. The placement of buttons, the types of information that is presented, the color, the choice of words, and other aspects of a webpage may be compared in A/B testing.

Figure 3:
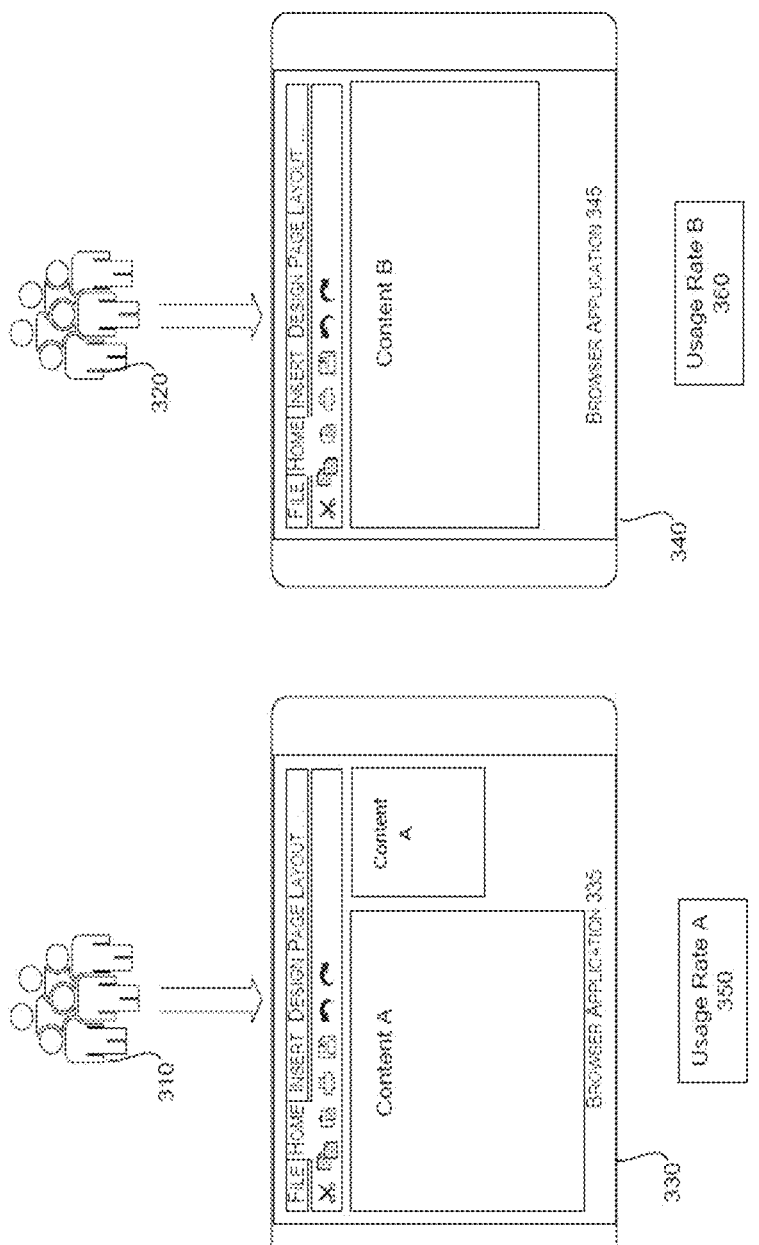
FIG. 3 is a diagram showing aspects of a randomized experiment according to one embodiment disclosed herein.

FIG. 3 illustrates one example of A/B testing where the response to different versions of a webpage may be collected. By randomly assigned users with two versions of a webpage that differs, the treatment effect of the design can be measured. Such two-sample hypothesis tests can generally be used for comparing the difference in response between two versions.

The sample counts of a test variant and control variant may be accumulated gradually after the experiment starts. It may be more efficient to alert experimenters as early as possible of an issue with an imbalance between experimental populations. This way, the experiment may be halted to investigate observed deviations from expected counts, rather than continuing to gather inputs and even complete the test only to find out that the sample distributions were skewed from the designed traffic ratio.

In one embodiment, the sample delta, which may be defined as the difference between the expected sample count ratio and the observed sample count ratio of two branches, can be used to monitor and determine if there are any potential issues with the sample count distribution, such as an unbalanced distribution. It is desirable to detect and determine early if sample counts are already skewed while the sample count is small and fluctuating. The use of time series metric anomaly detection models may not provide the desired results, as these models typically require a sample count history as a learning period. The disclosed embodiments allow for the detection of skew without an extensive learning period. Statistically consistent skew detection may be provided over time, while the false positive rate may be controlled and/or reduced. For example, existing algorithms that are based on the t-test of the difference of sample sizes may be overly sensitive.

In an embodiment, a sample delta algorithm may be implemented that creates two independent hypothesis tests for detecting upper and lower boundaries of the sample delta metric. The logarithm of the likelihood ratio of the observed sample counts under null and alternative hypotheses may be used as test statistics, and sequential test algorithms and rules may be applied to control the false positive/negative rates.

In some implementations, $$X_1^T, \ldots, X_K^T \text{ and } X_1^C, \ldots, X_K^C$$

may be the cumulative sample count in treatment (T) and control (C) groups at time K with expected traffic ratio $r^T$ and $r^C$. Two-sided hypothesis testing may be performed under a binomial setting:

$$H_0 : p - p_0 = \frac{X_K}{N_K} - p_0 = 0$$

-continued $$H_A : p - p_0 \neq 0 \text{ with}$$

$$X_K = X_K^T \text{ and}$$

$$N_K = X_K^T + X_K^C$$

and observed ratio $$p = \frac{X_K^T}{X_K^T + X_K^C} = \frac{X_K}{N_K}$$

and expected ratio $$p_0 = \frac{r^T}{r^T + r^C}$$

for each test-control pair:

$$H_0: \ p - p_0 = \frac{X_K}{N_K} - p_0 = 0$$

$$H_A: \ p - p_0 \neq 0$$

In some cases, this may result in high sensitivity, especially when $N_K$ is large. The sensitivity here means that a small deviation (e.g., a 0.1% difference) may be detected as being significant at the outset of the experiment.

According to one embodiment, the following null and alternative hypothesis may be presented:

$$H_0 : |p - p_0| \leq \delta$$

$$H_A : |p - p_0| \geq \delta$$

where $\delta$ (error threshold) is a hyperparameter that may be tuned based on requirements for a particular use case. One issue that may be addressed is that the same test may be repeatedly conducted on a regular basis (e.g., hourly or daily). This may inflate the false positive rate ($\alpha$-inflation) due to "peaking" behavior. Instead of conducting a one-sample t-test, in some embodiments a sequential probability test (SPRT) may be performed to avoid inflated type-I error.

In one embodiment, two one-sided hypothesis tests can be conducted for each test-control pair:

| Test A | Test B |
|---|---|
| $H_0$: $p - p_0 = 0$ | $H_0$: $p_0 - p = 0$ |
| $H_A$: $p - p_0 \geq \delta_A$ | $H_A$: $p_0 - p \geq \delta_B$ | where $\delta_A$ and $\delta_B$ can be different.

In one implementation, $\delta_A = \delta_B = \delta = \min (5\%, 20\% \min (p_0, 1-p_0))$.

The testing statistics (log likelihood ratio) are:

$$T_K^A = \frac{l_{H_A}}{l_{H_0}} = -\frac{\delta^2 - 2\delta(\hat{p}_K - p_0)}{2\hat{\sigma}_K^2}$$

5

-continued $$T_K^B = \frac{l_{H_A}}{l_{H_0}} = -\frac{\delta^2 + 2\delta(\hat{p}_K - p_0)}{2\hat{\sigma}_K^2} \text{ where}$$

$$\hat{p}_K = \frac{x_K}{n_K}$$

In this example, lower case variables indicate that it is drawn from a random variable and $$\hat{\sigma}_K^2 = \frac{\hat{p}_K(1 - \hat{p}_K)}{n_K}$$

In another embodiment, using the binomial distribution directly and not the normal distribution via the central limit theorem (CLT):

$$T_K^A = x_K^T \log\left(\frac{p_0 + \delta}{p_0}\right) + x_K^C \log\left(\frac{1 - p_0 - \delta}{1 - p_0}\right)$$

$$T_K^B = x_K^T \log\left(\frac{p_0 - \delta}{p_0}\right) + x_K^C \log\left(\frac{1 - p_0 + \delta}{1 - p_0}\right)$$

A critical region may be defined that is based on α (type I) and β (type II). For any K=1, . . . , ∞:

$$\text{if } T_K > \log\left(\frac{1 - \beta}{\alpha}\right) : \text{reject } H_0 \text{ and accept } H_A \text{ Break;} \quad \text{A}$$

$$\text{if } T_K > \log\left(\frac{\beta}{1 - \alpha}\right) : \text{accept } H_0 \text{ Break;} \quad \text{B}$$

$$\text{otherwise : Continue monitor;} \quad \text{C}$$

In some embodiments, a variant can be implemented as follows:

Set β=0. For any K=1, . . . , ∞:

$$\text{if } T_K > \log\left(\frac{1}{\alpha}\right) : \text{reject } H_0 \text{ and accept } H_A \text{ Break;} \quad \text{A}$$

$$\text{otherwise : Continue monitor;} \quad \text{B}$$

Figure 1:
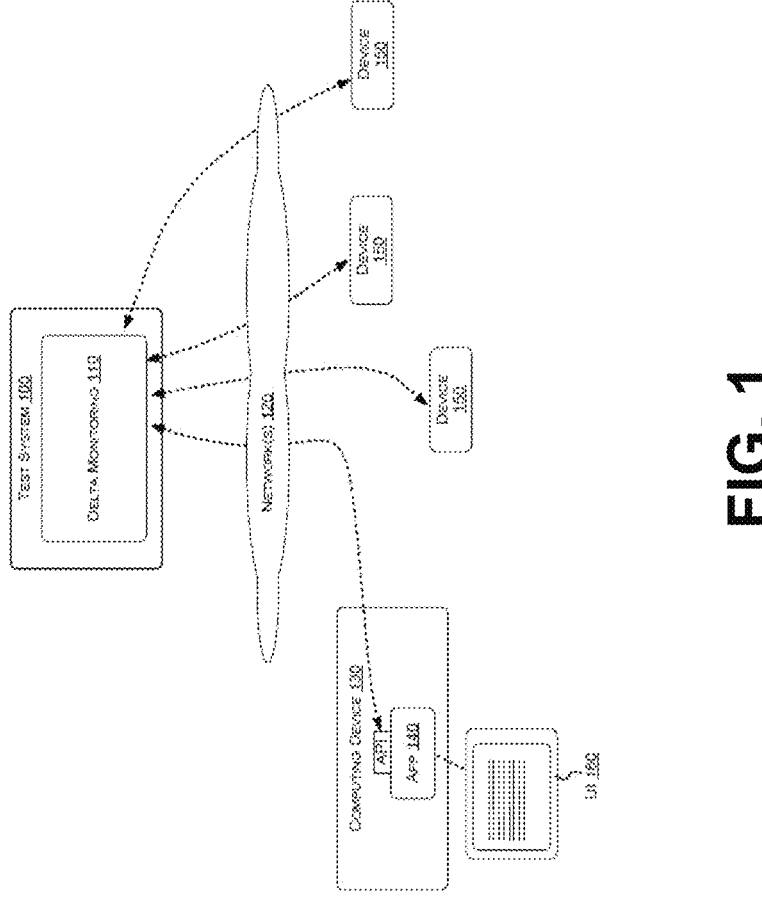
FIG. 1 is a system diagram illustrating one embodiment disclosed herein.

In the example system illustrated in FIG. 1, a test system 100 is illustrated that implements delta monitoring function 110. The delta monitoring function 110 may be configured to manage and conduct randomized tests on various devices 150 over a network 120, as well as computing device 130. A user interface 160 may be rendered on computing device 130. The user interface 160 may be provided in conjunction with an application 140 that communicates to the delta monitoring function 110 using an API via network 120. In some embodiments, test system 100 may be configured to conduct controlled experiments while detecting sample skew between control and experimental groups. In one example, sample delta monitoring function 110 may be configured to detect skew using the difference in sample counts between two or more test populations without requiring a learning period.

Figure 2:
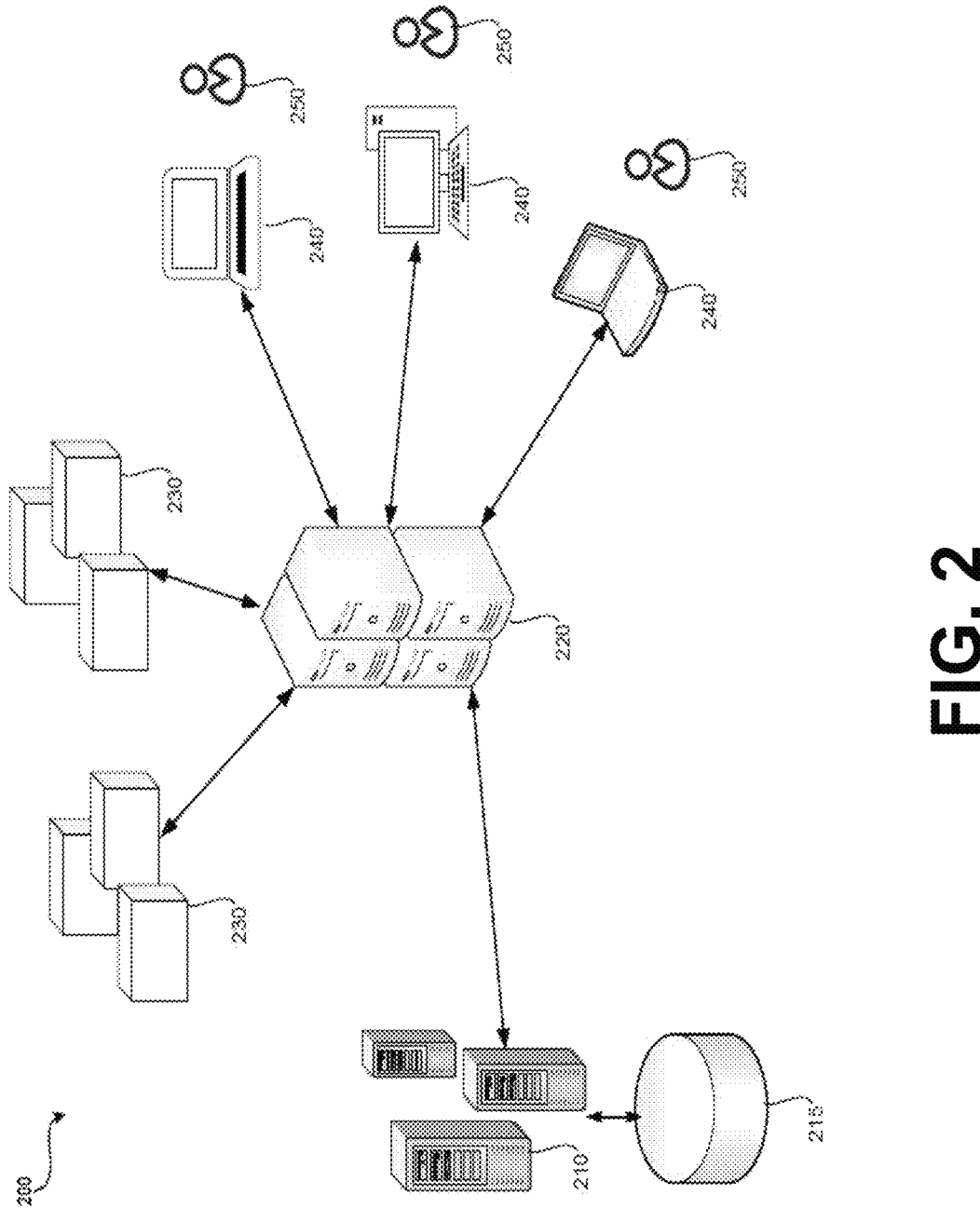
FIG. 2 is a diagram showing aspects of an example system according to one embodiment disclosed herein.

FIG. 2 illustrates a block diagram showing an example test conduct and monitoring embodiment. FIG. 2 illustrates a test conduct and monitoring environment 200 that may include servers 210. The servers 210 may comprise one or more servers, which may collectively referred to as "server." The test conduct and monitoring environment 200 may further include a database 215, which may be configured to store various information used by the server 210 including test conditions, test parameters, test data, and the like. The test conduct and monitoring environment 200 may further include communications server 220, which, for example, enables network communication between the server 210, online servers 230, and client devices 240. The client devices 240 may be any type of computing device that may be used by users 250 to connect with the server 210 over a communications network. Users 250 may be, for example, users who are accessing services provided by communications server 220 and/or online servers 230. The servers 230 may be operated by any party that is involved in providing, for example, online services. For example, the servers 230 may be configured to implement auction sites or online transactions. Accordingly, the servers 230 may be any type of computing device described herein as may be operated by an auction broker, a financial institution, and the like. The servers and devices represented in FIG. 2 communicate via various network communications hardware and software to facilitate the collection and exchange of data for use in a networked environment.

FIG. 3 illustrates one example of a test conduct and monitoring implementation. As part of performing a randomized controlled trial, an experiment may be run with two website variants that are rendered by browser application 335 running on a UI 330, and browser application 345 running on a UI 340. In this example, A/B testing may be used to compare two versions of a webpage, for example by testing the responses of subject group 310 to the variant implemented in browser application 335, and the responses of subject group 320 to the variant implemented in browser application 345. A usage rate 350 may be accumulated for the variant implemented in browser application 335, and usage rate 360 may be accumulated for the variant implemented in browser application 345. The usage rate information may be used to determine which of the two variants is more consistent with one or more objectives. In one example, the version implemented on browser application 335 may be a current or control version, and the version implemented on browser application 345 may be the treatment version that is modified in some respect. For example, the results can be compared to determine if the treatment version results in higher sales volume. The treatment version may include changes in format and layout.

Figure 4:
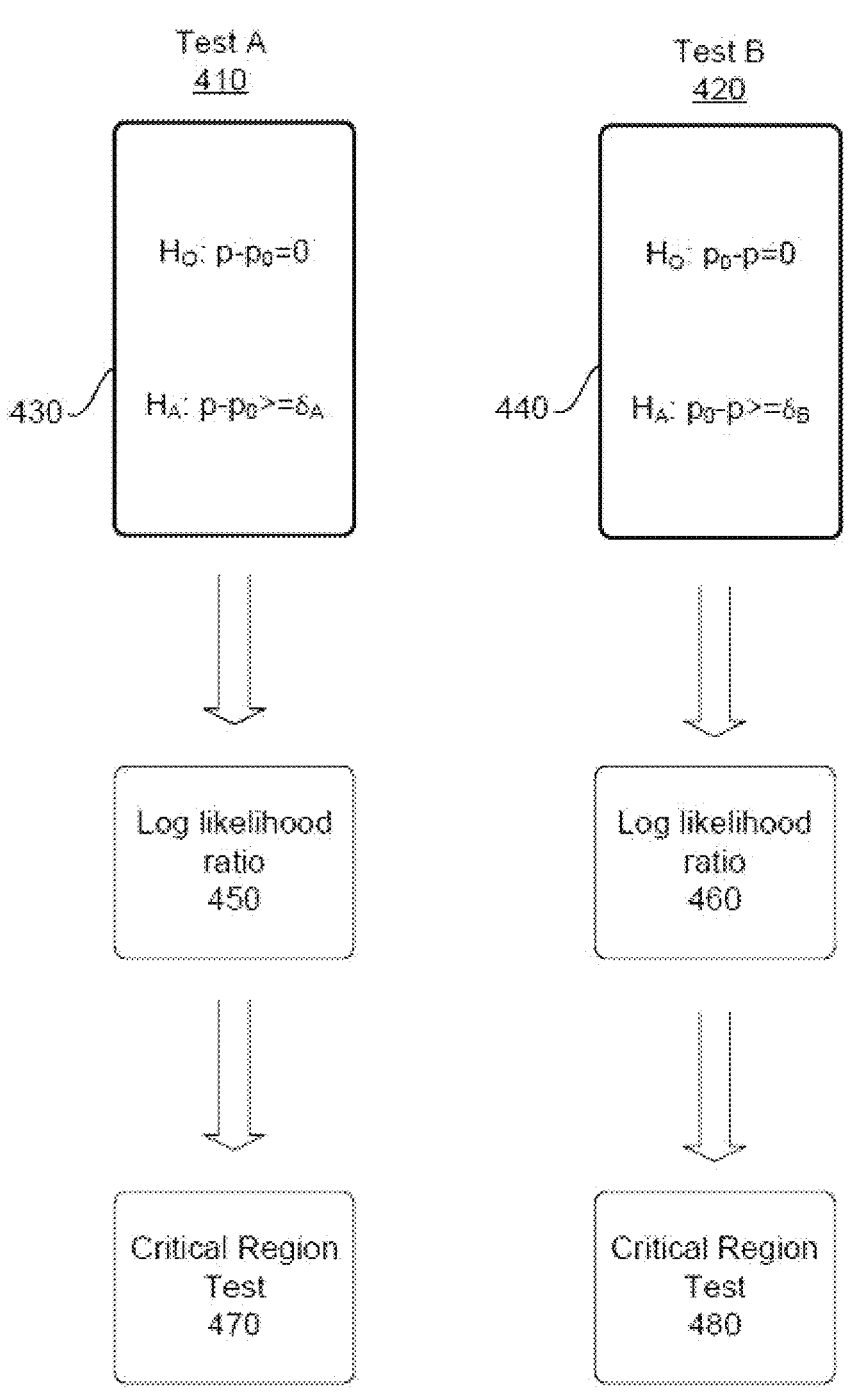
FIG. 4 is a block diagram illustrating one example of skew detection as disclosed herein.

FIG. 4 illustrates an example flow diagram showing an embodiment of two independent hypothesis tests and detecting upper (8A) and lower (8A) boundaries of the sample delta metric. In the figure, for test A 410 and test B 420, the following hypothesis tests can be conducted for each test-control pair:

Block 430:

$$H_O: p - p_0 = 0$$

$$H_A: p - p_0 >= \delta_A$$

Block 440:

$$H_O: p_0 - p = 0$$

$$H_A: p_0 - p >= \delta_B$$

The log likelihood ratio can be determined in blocks 450 and 460. A critical region test 470 and 480 may be conducted based on α and β.

FIG. 5 is a diagram illustrating aspects of a routine 500 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 500 begins at operation 501, which illustrates defining first and second experimental groups in the randomized controlled trial.

The routine 500 then proceeds to operation 503, which illustrates receiving a first set of data indicative of a first experimental group in the randomized controlled trial.

Operation 505 illustrates receiving a second set of data indicative of a second experimental group in the randomized controlled trial.

Next, operation 507 illustrates based on sample counts of the first and second sets of data, generating an indication that at least one of the experimental groups in the randomized controlled trial are skewed.

In an embodiment, the indication may be generated based on a difference between the sample counts of the first and second sets of data. In some embodiments, the sample counts may be current sample counts of the first and second sets of data.

In an embodiment, the indication may be generated based on determining that the difference between expected sample count ratio and observed sample count ratio of the first and second sets of data falls outside of a predefined error threshold. Additionally and optionally, the indication may be further generated based on a logarithm of a likelihood ratio of the observed sample counts.

In an embodiment, the likelihood ratio may be based on a non-zero error threshold. In some embodiments, a sequential probability ratio test may be applied to the difference to control a false positive rate.

FIG. 6 is a diagram illustrating aspects of a routine 600 for implementing some of the techniques disclosed herein.

The routine 600 begins at operation 601, which illustrates receiving a first set of data indicative of a first experimental group in a randomized controlled trial.

The routine 600 then proceeds to operation 603, which illustrates receiving a second set of data indicative of a second experimental group in the randomized controlled trial.

Operation 605 illustrates based on sample counts of the first and second sets of data, generating an indication that at least one of the experimental groups in the randomized controlled trial are skewed.

In an embodiment, the indication may be generated based on a difference between expected sample count ratio and observed sample count ratio of the first and second sets of data.

In an embodiment, the indication may be generated based on determining that the difference between the sample counts of the first and second sets of data falls outside of a predefined error threshold.

In an embodiment, the indication may be further generated based on a logarithm of a likelihood ratio of the observed sample counts.

In an embodiment, the likelihood ratio may also be based on a non-zero error threshold.

In an embodiment, a sequential probability ratio test may be applied to the difference to control a false positive rate. In one embodiment, the non-zero error threshold may be min (5%, 20% min ($p_0$, 1−$p_0$)), where $p_0$ is an expected ratio for each test-control pair.

In an embodiment, the first experimental group may be associated with a null hypothesis; the predefined error threshold may be based on a type I error rate (α) and a type II error rate (β); the null hypothesis may be rejected and an alternative hypothesis is accepted if a log likelihood ratio is greater than $\log((1−β)/α)$; and the null hypothesis may be accepted if the log likelihood ratio is less than $\log(β/(1−α))$.

In one embodiment, β=0 and the null hypothesis may be rejected the alternative hypothesis may be accepted if the log likelihood ratio is greater than $\log(1/α)$.

Figure 7:
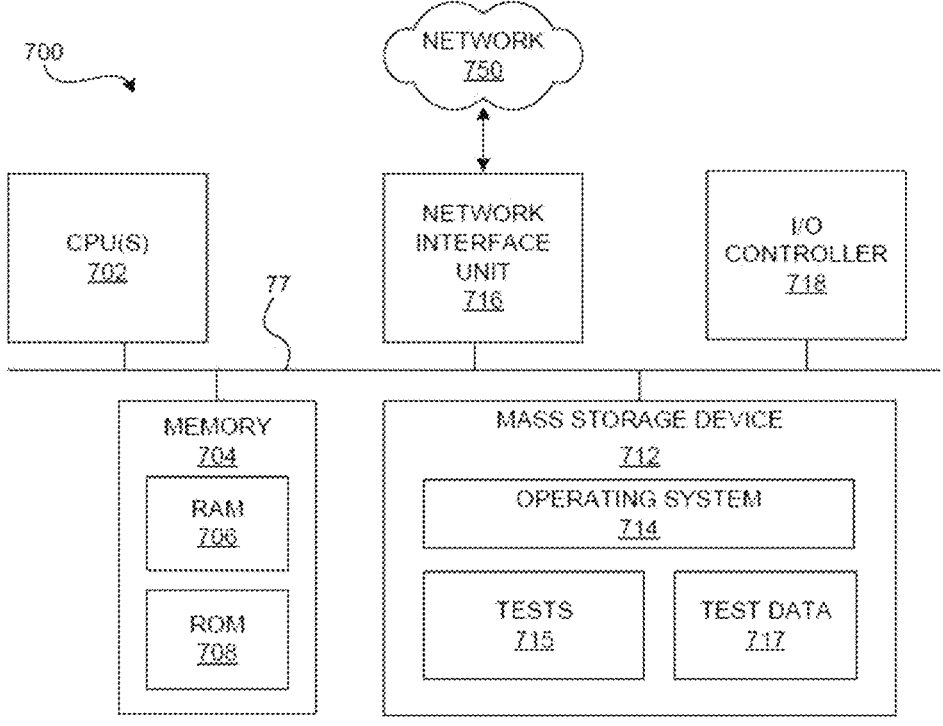
FIG. 7 is a computer architecture diagram illustrating aspects of an example computer architecture for a computer capable of executing the software components described herein.

FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a system bus 77 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, and one or more executable programs, such as programs for implementing randomized tests 715 or storing test results 717.

The mass storage device 712 is connected to the CPU 702 through a mass storage controller (not shown) connected to the bus 77. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 77. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7).

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 8:
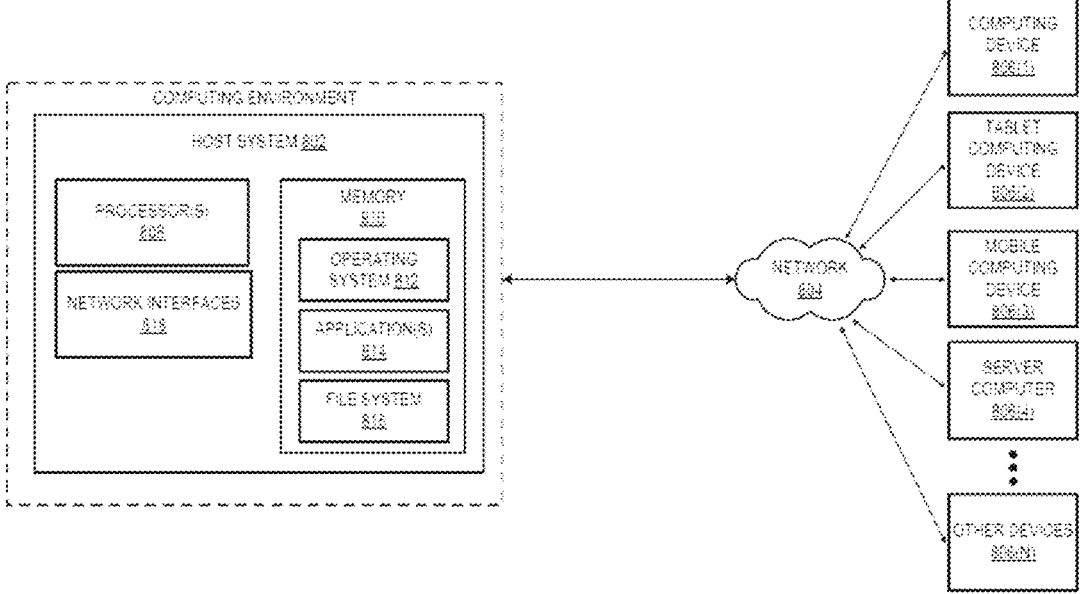
FIG. 8 is a data architecture diagram showing an illustrative example of a computer environment.

FIG. 8 illustrates an example computing environment capable of executing the techniques and processes described above with respect to FIGS. 1-7. In various examples, the computing environment comprises a host system 802. In various examples, the host system 802 operates on, in communication with, or as part of a network 804.

The network 804 can be or can include various access networks. For example, one or more client devices 806(1) . . . 806(N) can communicate with the host system 802 via the network 804 and/or other connections. The host system 802 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 802 can be provided by one or more servers that are executing as part of, or in communication with, the network 804. A server can host various services, virtual machines, portals, and/or other resources. For example, a can host or provide access to one or more portals, Web sites, and/or other information.

The host system 802 can include processor(s) 1208 memory 810. The memory 810 can comprise an operating system 812, application(s) 814, and/or a file system 816. Moreover, the memory 810 can comprise the storage unit(s) 82 described above with respect to FIGS. 1-7.

The processor(s) 808 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 810.

The memory 810 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 802 can communicate over the network 804 via network interfaces 818. The network interfaces 818 can include various types of network hardware and software for supporting communications between two or more devices.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the various technologies presented herein have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

The invention claimed is:

1. A method of monitoring variations in a randomized controlled trial, the method comprising:

defining first and second experimental groups of online users in the randomized controlled trial;

performing the randomized controlled trial, at least in part, by delivering different versions of digital content to the first and second experimental groups of online users;

receiving a first set of data indicative of responses to a first version of digital content by a first experimental group in the randomized controlled trial;

receiving a second set of data indicative of responses to a second version of digital content by a second experimental group in the randomized controlled trial;

calculating a delta value between the first and second sets of data using a sample delta monitoring algorithm;

based on the delta value between the first and second sets of data, generating an indication that at least one of the experimental groups in the randomized controlled trial are skewed; and based on the indication, halting the randomized controlled trial.

2. The method of claim 1, wherein the indication is generated based on a difference between the sample counts of the first and second sets of data.

3. The method of claim 1, wherein the sample counts are current sample counts of the first and second sets of data.

4. The method of claim 2, wherein the indication is generated based on determining that the difference between expected sample count ratio and observed sample count ratio of the first and second sets of data falls outside of a predefined error threshold.

5. The method of claim 2, wherein the indication is further generated based on a logarithm of a likelihood ratio of the sample counts.

6. The method of claim 5, wherein the likelihood ratio is based on a non-zero error threshold.

7. The method of claim 2, further comprising applying a sequential probability ratio test to the difference to control a false positive rate.

8. A computing system, comprising:

one or more processors; and a computer-readable storage medium having computer-executable instructions stored thereupon which, when executed by the processor, cause the processor to perform operations including:

performing a randomized controlled trial, at least in part, by delivering different versions of digital content to first and second experimental groups of online users;

receiving a first set of data indicative of responses to a first version of digital content by a first experimental group in a randomized controlled trial;

receiving a second set of data indicative of responses to a second version of digital content by a second experimental group in the randomized controlled trial;

calculating a delta value between the first and second sets of data using a sample delta monitoring algorithm;

based on the delta value between the first and second sets of data, generating an indication that at least one of the experimental groups in the randomized controlled trial are skewed; and based on the indication, halting the randomized controlled trial.

9. The computing system of claim 8, wherein the indication is generated based on a difference between expected sample count ratio and observed sample count ratio of the first and second sets of data.

10. The computing system of claim 8, wherein the sample counts are current sample counts of the first and second sets of data.

11. The computing system of claim 9, wherein the indication is generated based on determining that the difference between the sample counts of the first and second sets of data falls outside of a predefined error threshold.

12. The computing system of claim 9, wherein the indication is further generated based on a logarithm of a likelihood ratio of the sample counts.

13. The computing system of claim 12, wherein the likelihood ratio is based on a non-zero error threshold.

14. The computing system of claim 9, further comprising applying a sequential probability ratio test to the difference to control a false positive rate.

15. The computing system of claim 13, wherein the non-zero error threshold is min $(5\%, 20\%$ min $(p_0, 1-p_0))$, where $p_0$ is an expected ratio for each test-control pair.

16. The computing system of claim 11, wherein:

the first experimental group is associated with a null hypothesis;

the predefined error threshold is based on a type I error rate $(\alpha)$ and a type II error rate $(\beta)$;

the null hypothesis is rejected and an alternative hypothesis is accepted if a log likelihood ratio is greater than $\log((1-\beta)/\alpha)$; and the null hypothesis is accepted if the log likelihood ratio is less than $\log(B/(1-\alpha))$.

17. The computing system of claim 16, wherein $\beta=0$ and the null hypothesis is rejected and the alternative hypothesis is accepted if the log likelihood ratio is greater than $\log(1/\alpha)$.

18. A computer-readable storage medium having computer-executable instructions stored thereupon which, when executed by a processor of a computing device, cause the computing device to:

define first and second experimental groups of online users in a randomized controlled trial;

perform the randomized controlled trial, at least in part, by delivering different versions of digital content to the first and second experimental groups of online users;

receive a first set of data indicative of responses to a first version of digital content by a first experimental group in the randomized controlled trial;

receive a second set of data indicative of responses to a second version of digital content by a second experimental group in the randomized controlled trial;

calculate a delta value between the first and second sets of data using a sample delta monitoring algorithm;

based on the delta value between the first and second sets of data, generate an indication that at least one of the experimental groups in the randomized controlled trial are skewed; and based on the indication, halt the randomized controlled trial.

19. The computer-readable storage medium of claim 18, wherein the indication is generated based on a difference between expected sample count ratio and observed sample count ratio of the first and second sets of data.

20. The computer-readable storage medium of claim 19, wherein the indication is generated based on determining that the sample counts of the first and second sets of data falls outside of a predefined error threshold.

* * * * *